July 26, 1960
H. PIKAL
2,946,689
CARAMEL-COATED APPLE
Original Filed Nov. 16, 1955
2 Sheets-Sheet 1
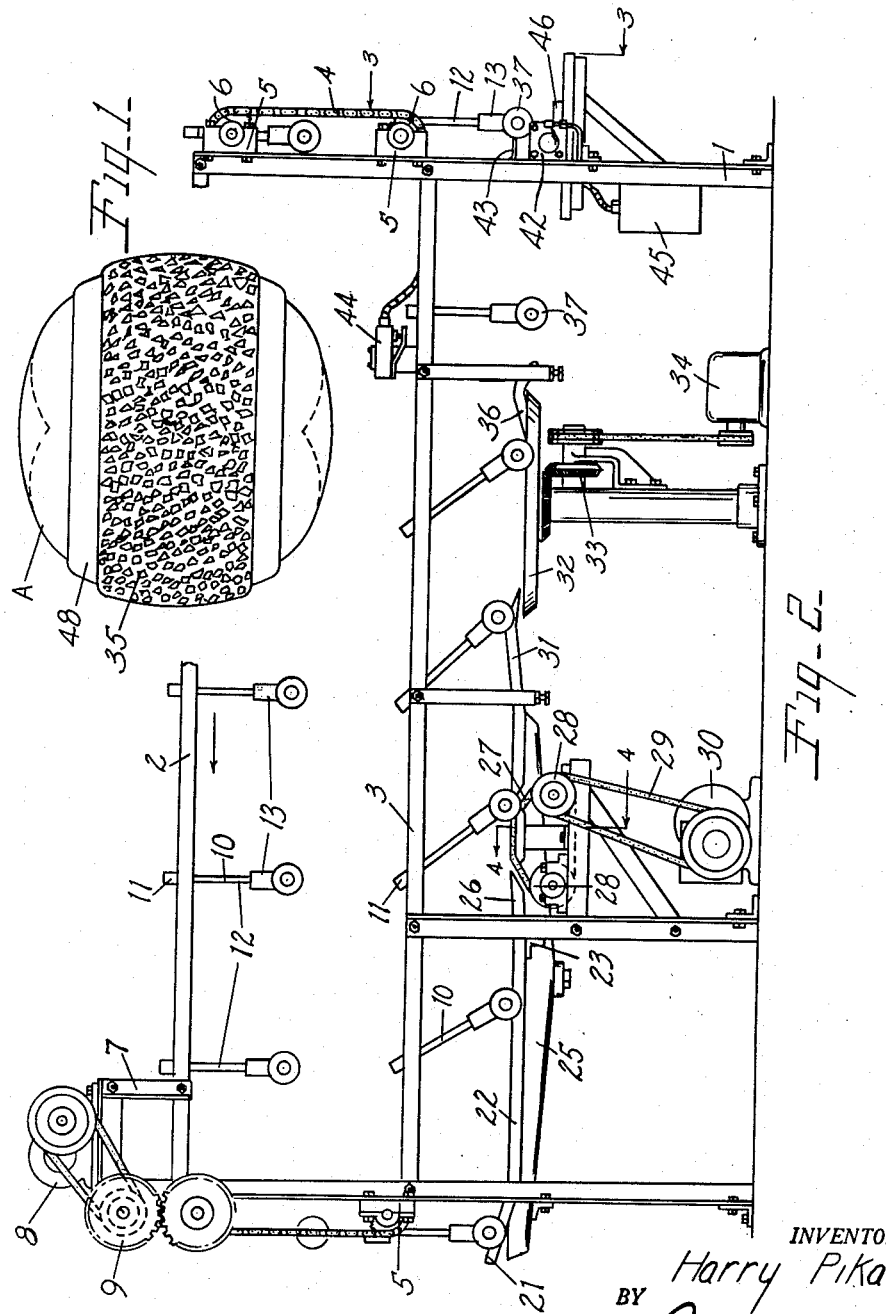
INVENTOR.
Harry Pikal
BY
John A. Earl
ATTORNEY.

July 26, 1960

H. PIKAL 2,946,689

CARAMEL-COATED APPLE

Original Filed Nov. 16, 1955

INVENTOR.
Harry Pikal
BY
Otto A Earl
ATTORNEY.

United States Patent Office 2,946,689
Patented July 26, 1960

2,946,689

CARAMEL-COATED APPLE

Harry Pikal, Bangor, Mich.

Original application Nov. 16, 1955, Ser. No. 547,057, now Patent No. 2,889,801, dated June 9, 1959. Divided and this application Aug. 11, 1958, Ser. No. 754,481

2 Claims. (Cl. 99—138)

This invention relates to improvements in edible confection coated fresh fruit. The subject matter of this invention has been divided from my co-pending application, Serial No. 547,057, filed November 16, 1955, now Patent No. 2,889,801, in response to a requirement for restriction of that application.

The principal objects of this invention are:

First, to provide a new article of edible food and confection in the form of a fresh unpreserved apple having its full natural skin imperforate and having a thin uniform coating of a confection such as caramel distributed over a substantial portion thereof in an annular fashion about the core of the fruit as an axis.

Second, to provide an apple as described above which further has an annular overcoating of a comminuted confection such as crushed nut meats adhered to the caramel undercoating.

Third, to provide a confection coated fresh fruit that has a relatively long shelf life due to its retention of its full natural skin as an imperforate protective cover for the meat of the fruit enclosed therewithin.

Other objects and advantages of the invention will be apparent from a consideration of the following description and claims. The drawings, of which there are two sheets, illustrate the article of the invention and apparatus for forming the same.

Fig. 1 is a side elevational view of an apple coated according to the present invention.

Fig. 2 is a fragmentary side elevational view of a machine for coating the apple shown in Fig. 1.

Figure 3:
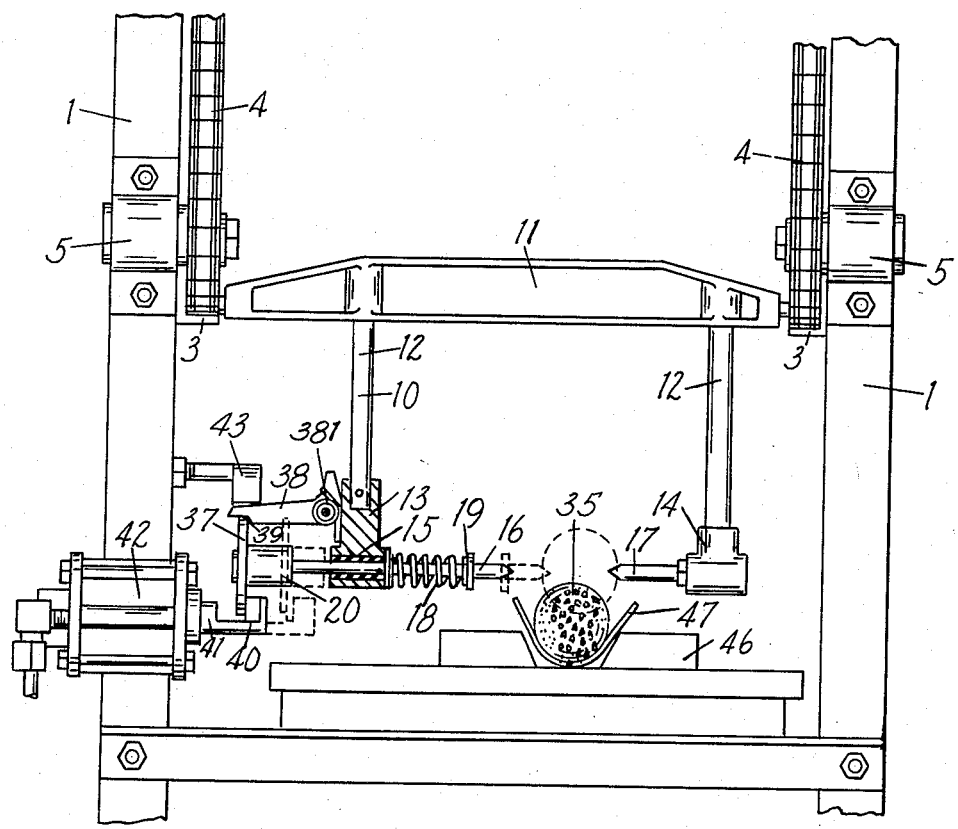
Fig. 3 is a fragmentary transverse cross sectional view taken along the plane of the line 3—3 in Fig. 2.

Caramel coated apples as an article of food or confection have been known heretofore but have universally been sold with the apples on sticks that serve as a handle both in coating and eating the apple. Placing the stick in the apple not only requires considerable effort but it also breaks the skin of the apple that forms a natural protective covering for the apple and the coated apples consequently spoil quite rapidly. The present invention provides a machine that effectively coats the apples without the use of sticks embedded in the apples and delivers the coated apples to a wrapper sheet that serves as a convenient and sanitary means for holding the finished confection.

The machine includes a suitable framework supported upon uprights 1—1 and having vertically spaced side rails 2 and 3. The side rails 2 and 3 are duplicated in transversely spaced relation to provide supports for spaced conveyor chain loops 4—4 having upper and lower horizontal reaches and upright end reaches. Bearing blocks 5 mounted at the ends of the side rails support sprockets 6 over which the chains 4 are trained. A raised framework 7 on one end of the main frame supports a driving motor 8 and suitable belts and gearing 9 for simultaneously rotating the conveyor chains in the direction indicated by the arrows in Fig. 2.

Figure 4:
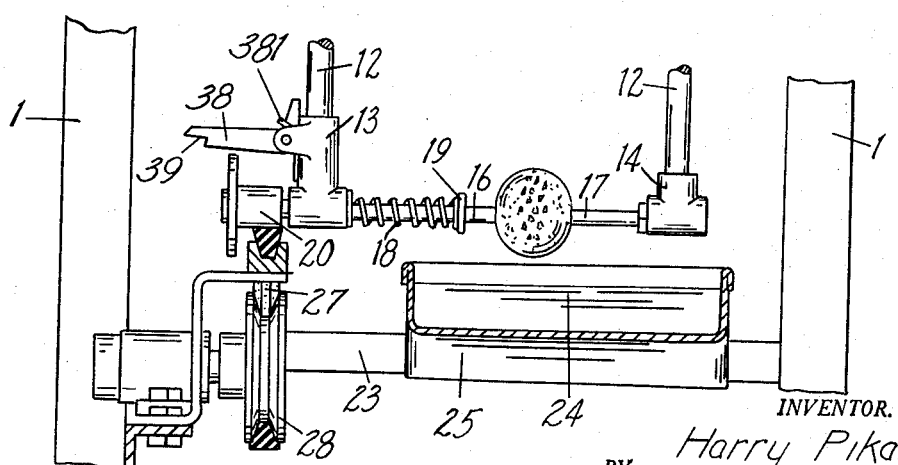
Fig. 4 is a fragmentary transverse cross sectional view taken along the plane of the line 4—4 in Fig. 2.

A plurality of carriers generally indicated at 10 are supported between the conveyor chain loops at spaced intervals along the conveyors. Each carrier 10 includes a cross beam 11 pivotally supported at its ends on the chains 4. Depending below the cross beam 11 are two transversely spaced hanger arms 12 having brackets 13 and 14 at their lower ends. The brackets 13 and 14 are provided with aligned transversely extending bearings 15 that rotatably receive chucking pins 16 and 17. The chucking pins 17 are axially fixed in their bearings but the pins 16 are axially slidable and biased toward the pins 17 by spring 18 bearing against the collars 19. Rollers 20 on the outer ends of the pins 16 limit the inward motion of the pins 16 so that the pins 16 and 17 are spaced apart by about the length of the smallest apple to be coated. It will be appreciated that the weight of the arms 12 and the apples carried thereby causes the carriers to hang vertically below the cross beams 11 at all times except when deflected from the vertical by some outside force. The chucking pins 16 and 17 are pointed to fit within the recessed ends of an apple without puncturing the skin of the apple as is best illustrated in Figs. 3 and 4. The carriers with apples mounted between the chucking pins move to the left along the upper side rails 2 as illustrated in Fig. 2 and descend along the left end of the framework until the rollers 20 on the chucking pins 16 engage and are deflected to the right by an inclined guide rail 21. The guide rail 21 is supported by a horizontal guide rail 22 carried by cross members 23 so that the arms 12 are inclined downwardly and to the right and advanced along the lower side rails 3 with the chucking pins and the rollers 20 rolling along the guide rail 22. The elevation of the guide rail 22 is fixed so that the lower portions of the apples A depend into a bath of heated and liquid caramel 24 contained in a dip tank 25. The rolling motion of the chucking pins and the apples causes substantially the entire surface of the apples to become coated with the heated liquid confection. The trailing or right end of the guide rail 22 is inclined upwardly as at 26 (see Fig. 2) to elevate the apples above the level of the liquid confection.

Positioned at the end of the inclined portion 26 of the guide rail is a short belt loop 27 trained around pulleys 28 to support and drivingly engage the rollers 20 on the chucking pins. The belt loop 27 and the pulleys 28 are rapidly rotated by a belt 29 and motor 30 to spin apples and throw off excess liquid confection by centrifugal force. Since the axis of rotation of the apples is horizontal, liquid is thrown both downwardly into the tank 25 and upwardly and for this reason the hanger arms 10 are of substantial length to position the cross beams 11 out of range of liquid thrown upwardly. The liquid then falls back into the tank and the parts of the machine do not become coated with wasted caramel.

After passing the spinning belt 27, the rollers 20 are carried by a guide rail 31 until the apple carried by the chucking pin is over one side of the table 32. The table 32 is rotatably driven by gears 33 and motor 34 in offset relation to the path of the apple so that the apple moves in chordal relation against the rotation of the table. The table is adapted to support a layer of ground nut meats which are supplied either manually or by automatic means not illustrated to apply an overcoating of nut meats to the periphery of the caramel coated apple as indicated at 35 in Fig. 3. It is essential that the nut meats be applied to the caramel coating before the caramel has cooled and while it is still soft and sticky so it is desirable to locate the table 32 in close proximity to the spinning belt 27. After the nut meat coating is applied a guide rail 36 picks up the rollers 20 and elevates the apple as it moves off of the table 32.

In order to facilitate loading and unloading of apples to and from the chucking pins 16 and 17, each roller 20 is provided with an annular collar or stop 37 and each bearing bracket 13 is provided with a pivoted latch 38 with a notch 39 in its outer end. The latch 38 is spring biased upwardly toward disengaged position by a coil spring 18 and normally assumes the position illustrated in Fig. 4. As the stops or collars 37 on the rollers 20 approach the right end of the framework they move along the outside of a retractor plate or release member 40 carried by the piston 41 of a pneumatic cylinder 42. At the same time the latch 38 moves under a depressing spring 43 that acts as a hold down means and depresses the latch into sliding engagement with the top of the collar or stop 37. A switch 44 tripped by the following carrier 10 actuates an electromagnetic valve 45 to actuate the cylinder 42 and retract the piston 41 and plate or release member 40 so that the collar 37 is moved outwardly and the latch 38 is pressed downwardly till its notch 39 locks against the edge of the collar 37 as illustrated in Fig. 3. This automatically retracts the chucking pin 16 and the coated apple falls into a notch in the receiving block 46. A piece of wax paper 47 placed over the receiving block prior to delivering of the apple will be folded upwardly as shown in Fig. 3 to form a convenient wrapper for the coated apple so that it can be handled and packed without touching the sticky coating.

The pressure of the spring 18 on the chucking pin 16 is sufficient to hold the latch 38 engaged with the collar 37 as the carrier moves upwardly along the right end of the framework. The chucking pins 16 and 17 are therefore held in widely spaced relation and it is a simple matter for the operator to press a new apple between the pins as the conveyor is advanced. A slight push on the chucking pin 16 releases the latch 38 which then moves upwardly and the chucking pin 16 then automatically moves the apple against the opposing pin 17.

The coated apple A as the new product is shown in Fig. 1 wherein the caramel coating appears at 48 extending almost to the ends of the apple and the annular coating of nut meats or other comminuted confection appears as 35. Due to the complete imperforate character of the skin of the apple and also due to the rapidity with which the hot caramel is applied to the apple and excess caramel thrown off, the skin continues to act as the natural preserving cover for the meat of the apple and the coated apples have a long shelf life of from six to eight weeks.

Having thus described the invention what is claimed as new and desired to secure by Letters Patent is:

1. As an edible confection article, a fresh apple with its full natural skin imperforate and having an annular band of caramel confection adhered to its surface completely around the apple with the core of the apple as the axis of the band and with an overcoated layer of a comminuted confection embedded in the layer of caramel.

2. As an edible confection article, a fresh apple with its full natural skin imperforate and having an annular band of caramel confection adhered to its surface completely around the apple with the core of the apple as the axis of the band.

References Cited in the file of this patent

UNITED STATES PATENTS

| 1,462,883 | Cloud | July 24, 1923 |
| 2,558,234 | Canfield | June 26, 1951 |